United States Patent Office 3,418,724
Patented Dec. 31, 1968

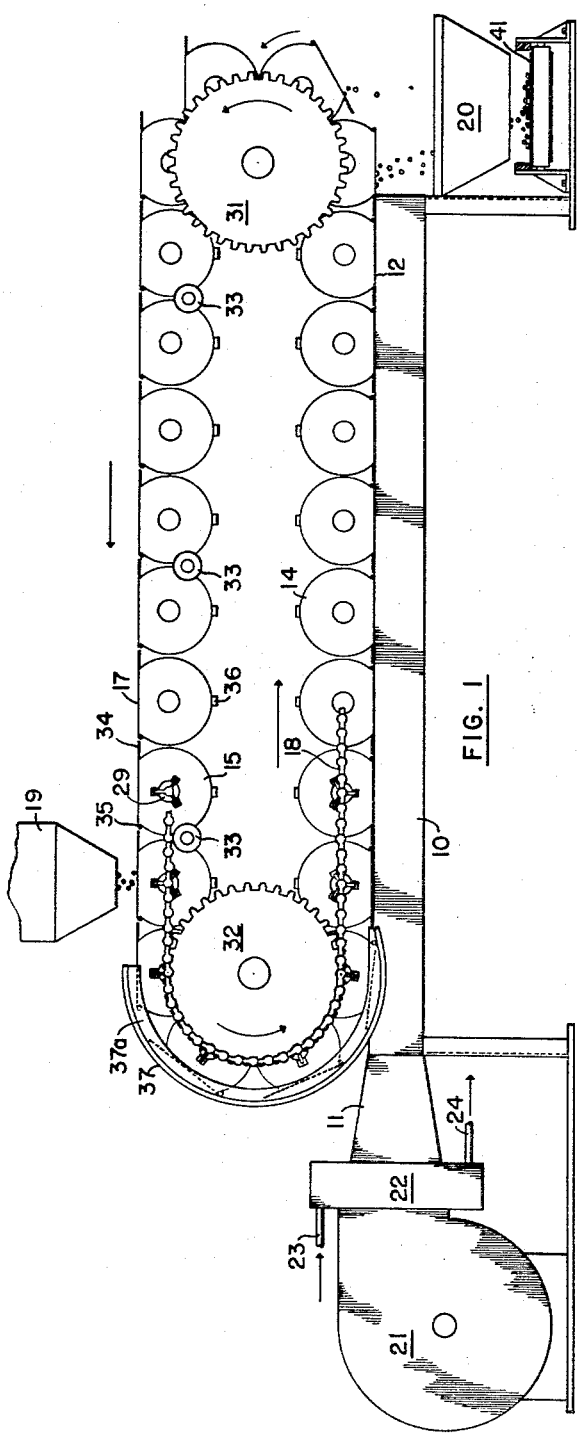
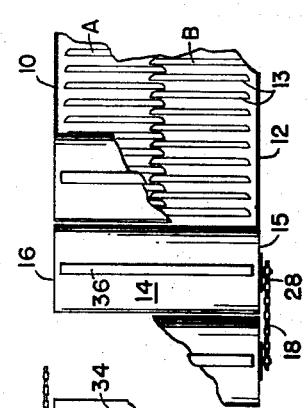
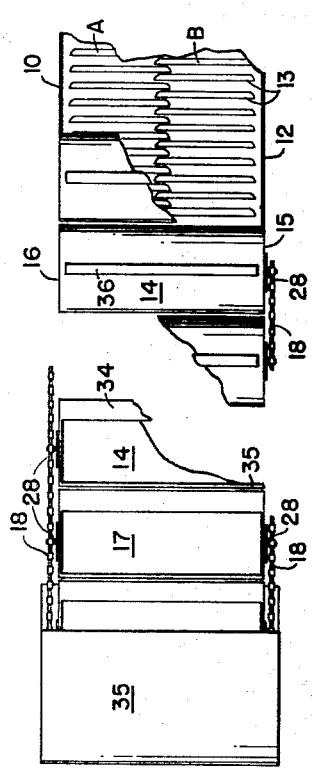

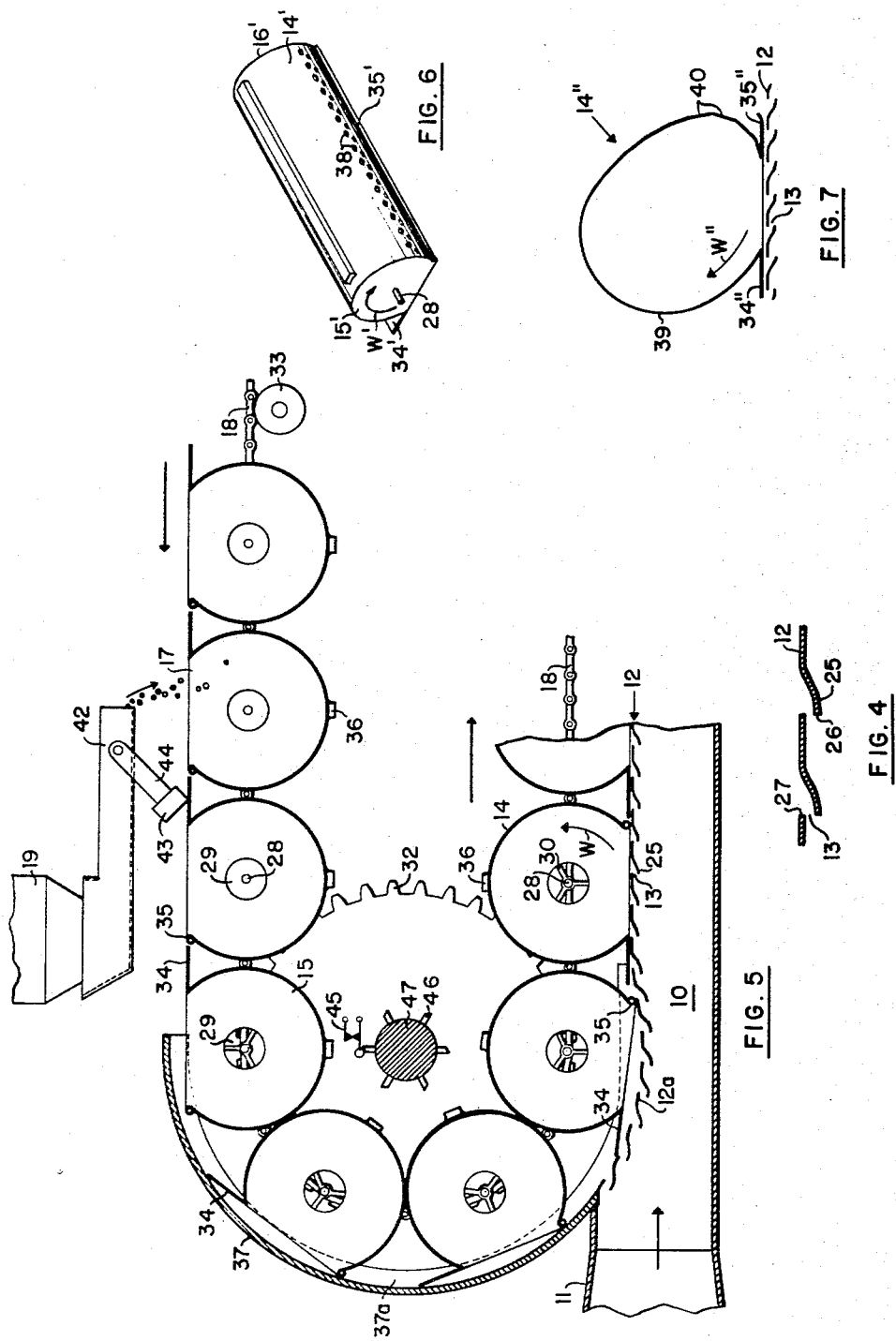

3,418,724
METHOD AND APPARATUS FOR SUBJECTING MATERIAL TO CONDITIONING GAS WITH WHIRLING MOTION
Rudolph E. Futer, Oakland, Calif., assignor to Banger Punta Operations, Inc., Oakland, Calif., a corporation of New York
Continuation-in-part of application Ser. No. 486,965, Sept. 13, 1965. This application Oct. 11, 1967, Ser. No. 687,406
22 Claims. (Cl. 34—10)

ABSTRACT OF THE DISCLOSURE

Small objects, particles or liquid, are subjected to a conditioning gas, e.g., to heat or cool them or, in the case of solids, to change their humidity, by supplying them to a whirl chamber defined by a confining wall at least a part of which is a membrane wall having a plurality of gas passages directed to emit a series of gas jets spaced apart in the circumferential direction by less than the throw distance of one gas jet to form a high-velocity gas current which moves peripherally about the chamber wall and entrains the material being treated, moving the material adjacently to said wall. The chamber may be one of a series of passive housings which are moved along a stationary membrane wall constituting the active part of each chamber; or the apertured membrane wall may be a fixed part of the chamber. In either case, the material is subjected to repeated blasts from the gas jets during each circuit, and, in the embodiments shown, many circuits are made about the chamber wall.

---

This is a continuation-in-part of my application Ser. No. 486,965, filed Sept. 13, 1965, now abandoned.

The invention relates to a method and apparatus for changing the condition of material by the action of a conditioning gas which is in rapid whirling motion and entrains the said material, the term "condition" being used herein, for brevity, to include temperature and/or humidity of or concentration. The invention is applicable to treating particles such as grain, sawdust, cement, nuts, berries, plastic nibs and powdered material, or liquid, such as milk or chemical solutions or mixtures; the conditioning gas may be air, either untreated, dehydrated, or containing moisture vapor or droplets, e.g., in a controlled concentration, and may be heated or cooled, or may be any other gas, such as nitrogen, carbon dioxide or methane, either pure or containing vapors of a liquid to be absorbed or emitted by the material undergoing treatment.

The invention can be used, for example, to chill or freeze vegetables or fruits, such as berries, or for heating materials such as plastic nibs or powder, or comminuted metal, before the material is fed to a furnace, extruder or other treating unit. Other uses are to dry or humidify the material to a desired moisture content and to heat, cool or concentrate liquid to any desired degree. The term "moisture" is used broadly herein to include water and non-aqueous liquids that may occur in or be absorbed by the material being treated, or occurring in or constituting in vaporized form the conditioning gas.

The rapidity of the change in condition of such material by contact with a conditioning gas depends largely on the relative velocity between the gas and the material (whereby the boundary layer or film of gas enclosing the solid or liquid material is destroyed or fresh surfaces are created in a liquid), upon the difference between the properties of the gas (e.g., its temperature and/or humidity) and the properties of gas in equilibrium with the material in its desired ultimate condition, and upon the separation between the individual drops or objects undergoing treatment as well as the tumbling motions of solid objects, the last being often important to expose all sides to the gas. Further, the material must be subjected to the gas for a residence time sufficient to effect the desired change in condition.

It is desirable that all parts of the material be subjected to the conditioning gas for approximately the same residence times, both to economize on the size of the equipment and the expenditure of power to compress the conditioning gas and to avoid excessively long exposure of some of the material to the gas, which can result in a non-uniform change in conditions and may, in some situations, alter other characteristics and damage portions of the material by over-exposure to the gas.

Further, it is important in such treatments to engage the material with the conditioning gas in such a way as to promote a rapid equilibrium between the gas and the material. This involves insuring that there is a high relative velocity between them.

Prior methods and apparatus for subjecting small or subdivided material to the action of a conditioning gas have been deficient as to one or more of the above-mentioned desirable features. In particular, those that carried objects by a conveyor through an enclosure containing either still or moving gas did not continually disrupt the boundary layer. On the other hand, those that entrained the material in a current of gas flowing through a duct or about a whirl chamber or cyclone were wasteful of the conditioning gas, leading to excessive compression costs, and attained only a slow change in the condition of the material because: (1) they employed the principle of concurrent flow in which the material was merely carried by a gas current and the gas had, throughout most or all of the residence time, a low velocity relative to the material; and (2) they did not retain the individual units of the material in contact with the conditioning gas for equal residence times. Also, prior apparatus often conducted the conditioning gas into the treating enclosure in a manner leading to turbulence, thereby causing energy loss.

Now according to this invention, it was found that material such as small solid objects or particles or liquid can be effectively subjected to the action of a conditioning gas with improved results by admitting the gas into a whirl chamber having a confining wall as a series of closely spaced gas jets which cooperate to form a gas current moving peripherally about the chamber, and admitting the material into the whirl chamber for entrainment by said gas current, the velocity of the current being sufficiently high to cause the material to move adjacently to the chamber wall, whereby the units of the material are subjected in each of one or more circuits about the chamber to blasts from several successive gas jets. These jets emanate from locations on the confining wall that are spaced apart in the circumferential flow direction of the gas current by distances less than the throw distance of one jet and have their major flow components in a common circumferential direction (which need not be along a true circle but may be skewed to follow a helical path within the chamber), the said locations being such that at least one jet emanates beneath another gas jet that is still in being. Preferably, jets are emitted from at least three and, in most embodiments, from a larger number, such as ten or more, passages through the chamber wall situated at the stated small spacings.

As a gas jet moves outwardly from its origin its gas diffuses laterally and its forward momentum decreases. At a certain distance from the origin, herein called the "throw" distance, the jet can be deemed to be dissipated and no longer "in being." For the purposes of the present specification, a gas jet is considered to be "in being" when its velocity pressure in the jet direction, after moving through otherwise still air, is at least 10% of its original velocity pressure, e.g., as measured by a pitot tube pointed in the upstream direction, all pressures being relative to the static pressure of the air immediately outside of the jet.

The consequence of providing such a plurality of successive gas jets which are spaced and positioned to cooperate with one another is that a more useful gas current is formed than can be formed by a single gas jet, given the same total gas flow rate and pressure of the gas supply and the same angular inclinations of the gas jets to the local surface of the confining wall. This combination of closely spaced jets produces a gas current that is similar to a sheet of gas, which current flows at increased velocity along the confining wall. Such increased velocity is desirable to insure that the entrained objects or liquid dispersed as drops move adjacently to said wall, being urged to that path by centrifugal force. The effect of such closely spaced gas jets is described in detail and illustrated by graphs based on experimental data in my U.S. Patent No. 3,267,585, and the disclosure thereof is incorporated herein by reference. In brief, it is shown therein that the velocity component parallel to an apertured wall of a single gas jet emitted from the wall at a small angle to that wall is considerably less than the jet velocity (measured in its flow direction); and that a succession of such gas jets, spaced apart by distances less than the "throw" distance of one jet, causes a progressive increase in the velocity component parallel to the wall surface of the total gas current which results. The maximum velocity is attained beyond the third jet of the series. It may be that the jet emanating from each gas passage (save the one most upstream) is deflected toward the apertured wall by a jet from a more upstream location which is still in being, thereby causing each downstream jet to move more nearly parallel to the wall surface; however, no theory of the nature of this cooperative effect is herein relied upon.

By thus moving the material, entrained in the gas current, adjacently to the confining wall past the successive apertures in the confining wall, the material is subjected repeatedly to high-velocity gas jets in a single circuit about the chamber. Such a succession of jets produces a more rapid change in the condition of the material than would occur if the material were merely carried about the whirl chamber in a gas current of the same total quantity and the material were not subjected to such a succession of blasts. The subdivided material is, further, tumbled while passing the successive gas blasts.

According to another feature of the invention, the residence time of the material is controlled and made uniform among the portions thereof. Two alternative expedients are preferred: In one, a quantity of the material, e.g., a group of objects, is charged at one time into a whirl chamber, whirled therein by the treating gas for a selected period, and discharged at one time. For example, there can be a succession of housings, each forming a passive part of a whirl chamber, which are moved along a table provided with apertures and forming the active parts of said chambers. In the other expedient, the material is charged continuously and moved along a helical path for several circuits within a whirl chamber and discharged continuously; because all portions of the material follow more or less the same helical path, they make about the same number of circuits and are, hence given substantially equal residence times.

At least a part of the confining wall of the whirl chamber is formed of a membrane wall having a series of closely spaced apertures or gas passages extending therethrough, said membrane wall being the active part of the whirl chamber and forming a wall of a plenum chamber which is situated outside of the whirl chamber and to which the conditioning gas is supplied under pressure.

In one embodiment, the said membrane wall is a longitudinally elongated table and the passages emit jets making angles less than 35° to the surface of the membrane wall and all flow in about the same direction, such as longitudinally. The device includes a plurality of whirl chambers, each formed in part by the said active membrane wall and in part by an independent passive housing, each housing having a confining wall that extends through an arc more than half and less than a full circle and leaving an opening. The several housings are moved along the membrane wall with the openings thereof juxtaposed to the membrane wall, and the width of the opening (in the circumferential direction) is greater than the interval between gas passages, so that at least two and, preferably, more gas passages are at all time opposite the opening. Thereby progressively changing groups of jets cooperate to form a gas current which carries about each whirl chamber the objects which were introduced through the said opening. Each housing may have its confining wall imperforate and an opening at each end, displaced radially inwards from said wall, for the escape of gas in a substantially axial direction. However, the confining wall may, in certain embodiments, have small passages to permit gas to escape.

Although the arcuate extent of the passive housings was, for simplicity, stated as a fractional part of the arc of a circle, it will be understood that this does not imply that the whirl chamber is truly cylindrical; it may take any desired shape, such as elliptical, or may have a varying radius, e.g., decreasing in the direction of gas flow, or can even consist in part or entirely of successive flat sections, whereby its cross section is polygonal. Usually the whirl chamber has a constant cross section along its central axis; however, this is not in every case essential, and the cross section of the whirl chamber may, for example, be smaller at one end than at the other end.

In another embodiment, the whirl chamber consists of relatively immovable parts, the confining wall about the central axis including or consisting of the active membrane wall which is advantageously inwardly concave about said axis. For example, the chamber wall may be shaped as a cylinder or as some other surface of revolution about said axis. Again, the passages are formed to emit gas jets which make angles preferably less than 35° to the local part of the membrane wall, in a common circumferential or slightly helical direction. The active membrane portion may occupy any desired fractional part of the confining wall, up to 100%, but it conveniently extends through only a partial sector, usually between 20° and 130°, e.g., 90°, about the said axis, being advantageously situated at the bottom of the chamber to facilitate placement of the plenum chamber beneath the whirl chamber. The membrane wall is provided at least at the inlet end, so that the admitted material is immediately entrained by a gas current; it may extend fully or partially to the outlet through which the material is discharged. The material, after admission through the inlet near one end of the whirl chamber, makes several peripheral circuits along a helical or near-helical path before reaching the outlet near the other end. The residence time can be varied by altering the inclination of the central axis (which alters the pitch of the helical path) and can be altered by changing the spacing between the inlet and outlet, or by regulating the speed and direction of the gas current.

In all embodiments, the passages through the membrane wall may be formed as is described in my U.S. Patent No. 3,131,974, and may be elongated slits placed in one or more rows. However, passages of other configurations can also be used. It is desirable to form the passages by bending portions of the membrane wall outwardly into the plenum chamber, so that the surface of the membrane wall which is toward the interior of the whirl chamber is unobstructed to the movement of gas and said material adjacently to the membrane wall.

In all embodiments, fresh conditioning gas is admitted into the whirl chamber throughout substantially all of the period of residence of the material therein, thereby causing: (1) a continued high-velocity gas current throughout all or most of the residence period, whereby the material continues to move adjacently to the confining wall and is repeatedly subjected to blasts from the gas jets, and (2) an increase in the rate of change in the condition of the material, in that otherwise the temperature and/or the humidity of the gas would approach the condition in equilibrium with the material, leading to a decreased rate of change.

Having indicated the general nature of the invention, reference is made to the accompanying drawings forming a part of this specification and showing certain preferred embodiments, wherein:

FIGURE 1 is an elevation of one embodiment, parts appearing in section;

FIGURE 2 is a fragmentary plan of the parts of FIGURE 1 beneath the feeder;

FIGURE 3 is a fragmentary plan of the housing in the lower course of FIGURE 1, parts being broken away to show the membrane wall;

FIGURE 4 is a fragmentary longitudinal sectional view through a preferred form of the membrane wall, on an enlarged scale;

FIGURE 5 is a fragmentary longitudinal section, on an enlarged scale, of the front end of the same apparatus, parts appearing in elevation, and a modified form of the feed device being shown schematically;

FIGURE 6 is a perspective view of a housing, showing a modified embodiment wherein the gas escapes through small openings in the confining wall of the passive housing;

FIGURE 7 is a longitudinal section through the membrane wall and one movable whirl chamber, showing another modification;

Figure 11:
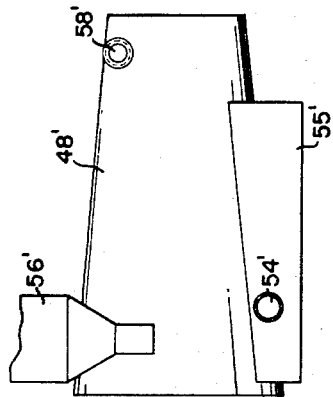
FIGURE 11 is an elevation of another modified embodiment, similar to the device shown in FIGURE 8.

Referring to FIGURES 1-5, the first embodiment includes, as its principal components; a plenum chamber of 10 which is supplied with gas under pressure through a supply duct 11; a longitudinally elongated active membrane wall 12 which forms the upper bounding wall of said plenum chamber and has extending therethrough a multitude of gas passages, e.g., formed by transverse slits 13 situated at close longitudinal intervals throughout all or most of its length; a plurality of passive whirl chamber housings 14, each being substantially trough-shaped and provided with end walls 15, 16, the said housings having openings 17 extending through their full lengths (transversely to said membrane wall); conveyor means, such as a pair of endless chains 18, situated one at each end of the housings; inlet means for the objects, such as a feed hopper 19 which is situated to supply the objects for flow by gravity into the housings through the openings 17 when the latter are upwardly directed; and outlet means such as a receiving hopper 20 situated at the rear end of the membrane wall.

A gas of any desired composition, such as cold air, is supplied to the duct 11 from a suitable source, such as a blower 21, which gas may pass through a temperature- and/or humidity-conditioning means, represented by a heat exchanger 22. The latter, if a cooler, may include a cooling coil through which a refrigerant is circulated via pipes 23 and 24.

The plenum chamber is closed at the bottom, sides and ends, save for its communication with the supply duct 11, and gas under pressure is supplied from this chamber to the several passages 13. These passages are inclined upwardly in a common longitudinal direction as shown in FIGURE 4, e.g., toward the discharge end (adjacent to the hopper 20) as shown, or, if desired, in the opposite longitudinal direction. Preferably the wall 12 is shaped to lie in straight longitudinal lines; its transverse section may be similarly situated in straight lines, whereby the said surface is flat; however, these are not absolute requirements, and other geometric shapes may be used for the said surface. The said surface is preferably free from obstructions and is longitudinally continuous, save for the depressed portions 25 that form the passages 13. These depressed portions have upstream edges 26 that underlie the downstream edges 27 of the continuous membrane wall by small gaps, such as 0.7 to 2.5 millimeters, when the passages are spaced longitudinally by distances such as 1.5 to eight centimeters. Thereby a plurality of passages 13 cooperate to form a gas sheet moving in a longitudinal direction with high velocity. Advantageously, the edge 27 do not overlap the edges 26, thereby achieving a minimum pressure loss in the gas and reducing the tendency for the accumulation of lint and dust between these edges.

The passages 13 may be formed as one or more rows of transversely elongated slits, having lengths many times the slit height, e.g., two longitudinal rows A and B as shown, with the slits of adjacent rows. This promotes the formation of a sheet of gas of uniform velocity and mass flow of gas, having a high velocity component parallel to the membrane wall surface for a given total flow of gas and gas supply pressure.

The housings 14 are secured to the conveyor chain 18 by pins 28 that are fixed to the end walls 15 and 16 of the housings and pivotally movable, either relatively to said end walls or to the chain. These pins are preferably situated eccentrically relatively to the center of gravity of each housing toward the opening 17, as shown, so that these openings are upwardly directed when moving in the upper course, away from the membrane wall 12. These pins may be located at various geometric locations. For example, in the embodiment shown, in which each housing 14 has the cross sectional shape of the segment of a circle extending through about 315°, they may be situated at the axis of revolution of said housings. When one or both of the end walls 15, 16, has a gas outlet opening 29 situated at said axis, the pins are mounted by open spiders 30 secured to the end walls, leaving the openings 29 free for the escape of gas. The chains 18 extend about an idler sprocket 31 and a drive sprocket 32 that is driven by suitable means, such as a variable-speed electric motor (not shown). A suitable number of support idler sprockets or boggies 33 are provided to support the chain 18 and, thereby, the housings 14 when in their upper course.

The chains 18 and the sprockets 31 and 32 are situated to cause the housings 14, when in their lower traverse or course, to move in close juxtaposition, e.g., in sliding relation, to the upper surface of the membrane wall 12. To this end each housing 14 may be formed with a confining wall, e.g., of sheet metal, extending arcuately about a circle through an arc of about between 270° and 330°, and formed at least at one end with a flange 34 that lies parallel to the surface of the wall 12 in close relation, e.g., in sliding engagement, therewith. The widths of the flanges 34 are preferably such that the adjacent housings are interconnected, as far as is practicable, by said flanges, to cover the outlet ends of all passages 13 that are not situated opposite the openings 17, as shown in FIGURE 5. The edge 35 of each housing away from the flange 34 may be enlarged and convex for sliding engagement with the membrane wall. However, other arrangements for preventing the flow of gas to destinations other than the housings, e.g., webs joining the housings, may be employed. This close juxtaposition of each flange to a part of the next housing (or provision of a web) minimizes the spillage of the small objects into gaps between adjacent housings when supplied from the feed hopper 19 and reduces waste of compressed gas from the plenum chamber. The lateral overall extent of the slits 13 is slightly less than the lengths of the housings 14, thereby avoiding waste of gas.

To cause the housings when in their upper course to assume positions with their openings 17 uppermost, it is necessary that provision be made, either by providing positioning means (not shown) or by locating the pins 28 toward the openings 17 from the centers of gravity of the housings. In the embodiment shown, this is effected by providing weights 36, thereby permitting the pins to be situated at the central axes of revolutions of the housings and of the openings 29.

The apparatus further includes a concave containing wall 37, mounted in stationary relation to the wall 12 and situated at the upstream end thereof, near the sprocket 32, and disposed to engage the flanges 34 and edges 35 of the housings during movement from their upper to their lower courses. The wall 37 assists in the inversion of the troughs and, by contact of the edges 35 thereof, prevents spillage of the objects from the housings during this inversion. To insure continuous contact of the edges 35, the wall 37 is smoothly joined to the wall 12, which has a dip 12a. The gas sweeps the dip to prevent accumulation of objects therein. Flanges 37a prevent lateral spillage.

The whirl chambers defined by the housings 14, the parts of the membrane wall 12 opposite the openings 17, and the end walls 15 and 16, are provided with means for outflow of gas without the said objects. In the embodiment being described, at least one end wall and, preferably, both end walls are provided with the opening(s) 29, previously mentioned, situated at or near the central axis of the whirl chamber and having a diameter smaller than that of whirl chamber. Because the objects entrained by the gas current move circumferentially in close proximity to the outer confining walls 12 and 14, they are not present in the eye of the gas vortex and only gas escapes through the opening(s) 29 in substantially axial directions. The pressure within the central part of each whirl chamber is thereby maintained closely to the ambient atmospheric pressure outside of the chambers. It will be understood that when the gas has a composition making it undesirable to vent it to the atmosphere, the entire apparatus is enclosed in a suitable hood (not shown) for collecting the discharged gas.

In a modified arrangement, shown in FIGURE 6, the end walls 15', 16' of the housings 14' may be imperforate, and the gas is discharged through small apertures having sizes small enough to retain the objects. In this embodiment, the sections containing the apertures 38 are shaped to conform to the curvature of the housing, where the apertures 38 can be localized in a limited zone of the housing. This zone is preferably situated in the parts of the housings in which the gas current flows downwardly. (In FIGURE 6 it is assumed that the gas current has a clockwise whirl direction, indicated by the arrow W', which requires the membrane wall slits to be upwardly inclined toward the front, as shown in the next embodiment.) It will be understood that the apertures 38 are merely illustrative, and that other openings may be provided; thus, the apertures 38 may be formed by woven wire screens. A flange 34' and heavy edge 35' may be provided, as described above for the parts 34 and 35.

In another modified arrangement, shown in FIGURE 7, the cross sectional contour of each housing is not arcuate but is, nevertheless, concave. As illustrated, the passages 13' in the membrane wall 12 are, in this embodiment, directed toward the feed end (i.e., toward the left, as viewed in FIGURE 1), and the housings 14" are formed so that each includes a section 39 which is joined to a flat flange 34" and has a curvature of diminishing radius in the direction of peripheral gas flow. The section 39 is joined to a plurality of flat segments 40, each angularly related to the others, to form, in cross section, a part of a polygon. The last of these segments is joined to a flange 35", of length to extend closely to the flange 34" of the adjoining housing 14" (not shown). (This replaces the thickened rubbing edge 35 previously described.) It is evident that a complete housing can be formed of only the sections 39 or only the sections 40, and the inclusion of both geometric forms in a single housing is illustrated principally to exemplify various embodiments of the invention. The overall cross section of the housing shown in this view is oblong, with the major axis inclined to the membrane wall upwardly in the direction of the gas sheet flow, in the direction shown by the arrow W". This results in a gradual deflection of the gas sheet.

Reverting to FIGURE 5, a specific means for preventing spillage of the objects being supplied to the troughs is indicated schematically. The feed hopper 19 is provided with a vibratory trough 42, actuated by a motor 43 mounted on a fixed support (not shown) and an actuating arm 44, that moves the trough vertically and longitudinally, e.g., through a clockwise circular path. The objects are discharged from the end of the trough only when the trough is vibrated by the motor 43. The motor is energized by a suitable electrical circuit (not shown) only when the opening 17 of a housing 14 is beneath the discharge end of the trough. For example, the energization of the motor can be controlled by a micro-switch 45 that is closed by cam surfaces 46 fixed to the shaft 47 that drives the sprocket 32. The vibratory feeder, being not a part of the invention and being well known per se, is not further described herein. It will be understood that one can use any other suitable means for feeding objects in coordination with the passage of the troughs and interrupting feeding when the openings 17 are not beneath the feed device, and that such a control is not always necessary, as when the gaps between the adjacent housings or their flanges are smaller than the minimum diameters of the objects, or when connecting webs are provided between successive housings. Similarly, various arrangements other than that shown are possible to prevent spillage of the objects from the housings while moving within the curved wall 37; the specific arrangement selected will depend upon the nature and sizes of the objects. Hopper 20 may feed a belt 41.

In operation, the objects to be treated by the gas are supplied to the housings 14, 14' or 14" as they move under the discharge of the feed device 19 or its chute 42. As each successive housing moves adjacently to the curved wall 37 it is inverted to bring its opening 17 to the bottom, adjacently to the active membrane wall 12. The edges 35 slide on the walls 37 and 12 to prevent loss of the objects from the housings. Thence the housings move in close proximity to the membrane wall, preferably in sliding engagement therewith, whereby the flanges 34 close the upper ends of the passages 13 that do not discharge into the openings 17. The plurality of longitudinally aligned passages 13 that discharge into a common opening 17 cooperate to form a current of gas having a high velocity parallel to the membrane wall, and the gas current is deflected by the confining, passive wall of the housing to move peripherally within the respective housing in a counterclockwise whirl direction shown by the arrow W (FIGURE 5). Each said current of gas entrains the objects, causing them to move peripherally many times about the whirl chamber until the respective housing reaches the rear end of the membrane wall and the objects wall into the hopper 20. (Movement of the gas sheet and objects is clockwise in the case of FIGURES 6 and 7.) During each circuit the objects are subjected repeatedly to blasts of gas as they move past the passages 13. These blasts move more rapidly than the objects and their repetitive actions promote a rapid change in state.

The speed of the housings may, for example, be such as to provide a residence time in each housing of from eight seconds to two minutes.

By supplying fresh air all along the membrane rapid changes in the conditions of the objects are insured. It is possible, for example, by supplying gas at a temperature of 75° F. to cool initially hot objects to about 80° F. although the average temperature of the effluent gas is considerably above 80° F.

Figure 10:
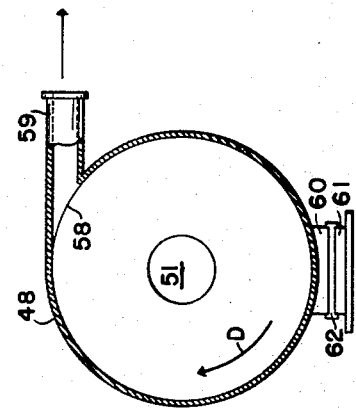
FIGURE 10 is a transverse sectional view showing the inlet taken on the line 10—10 of FIGURE 8.
Figure 8:
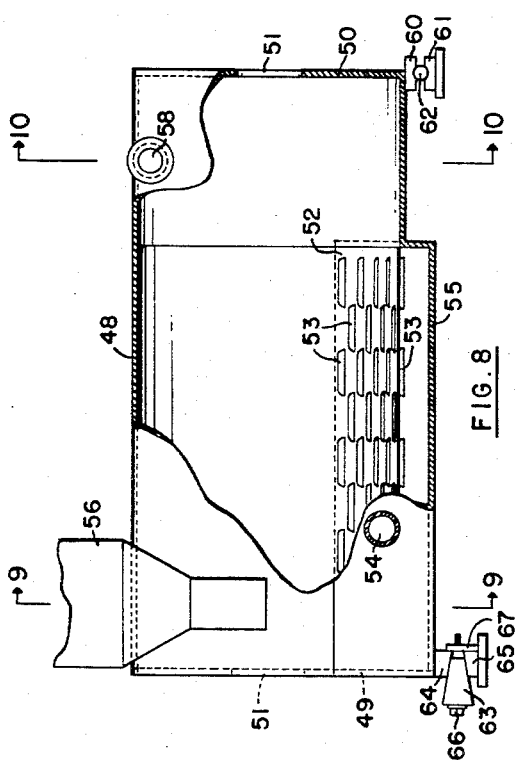
FIGURE 8 is an elevation of a further modified embodiment, wherein all parts of the whirl chamber are stationary relatively to each other, parts being broken away.
Figure 9:
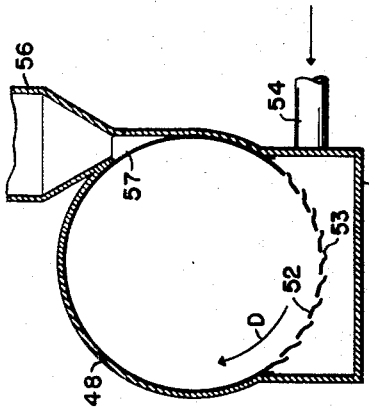
FIGURE 9 is a transverse section showing the outlet, taken on the line 9—9 of FIGURE 8.

According to the embodiment shown in FIGURES 8-10, the membrane wall is fixed to the housing of the whirl chamber and may form all or a fractional part thereof. In the specific embodiment shown, the active membrane wall constitutes only a minor fraction of the enclosing housing wall, e.g., from 20° to 130° about the central axis, and a passive, usually imperforate, wall complements the active wall. Thus, the whirl chamber shown includes a passive confining wall 48, e.g., of cylindrical shape and having a circular cross section, and end walls 49, 50, that may be imperforate or have central openings 51. These end walls may be removable for installation or replacement of a metal liner or wear plate. The active portion of the confining wall is a membrane section 52 which is curved in conformity to the wall 48 and is formed with passages 53 extending therethrough. These passages may be formed as described above for the passages 13, with rows of slits, each row extending in a circumferential direction through the extent of the membrane and the slits in adjacent rows being in overlapping relation, as shown. A plurality of successive slits, at least three and preferably many more, as shown, is provided in each said row of slits, the successive slits in each row cooperating to produce a gas sheet having a high velocity component parallel to the inner, circumferential surface of the chamber, in the direction indicated by the arrow D. Gas under pressure is supplied to the outer side of the active membrane section 52 by a supply duct 54 via a plenum chamber 55 that encloses the active section 52. The said gas may be conditioned as previously noted. The section 52 may extend through any desired longitudinal extent of the whirl chamber, such as through half or more, up to all of its length, preferably including the inlet end.

A feed hopper 56 is joined to an inlet opening 57 near one end of the chamber wall 49, situated preferably above the lowest part of the chamber, so that objects can be admitted by gravity and be entrained by the gas sheet formed in the active wall part and deflected peripherally about the passive part. The hopper 56 may include suitable means (not shown) such as a continuously driven star feeder, for regulating the rate of admission of the objects. At the other end the chamber has an outlet opening, such as an opening 58 to which is fitted a discharge duct 59 disposed tangentially to the confining wall.

Optionally, the apparatus is provided with means for adjusting the inclination of the central axis of the whirl chamber relatively to its horizontal position. These means are indicated schematically by a support member 60 secured to one end of the housing and pivoted relatively to a fixed support 61 by a pivot pin 62, and, at the other end, a vertically adjustable support. Vertical adjustment of the latter is possible by a wedge 63 that acts between a support 64 on the whirl chamber and a stationary support 65, and is movable by a screw 66 that is rotatable but axially secured to the wedge and in threaded engagement to a stationary plate 67 that is fixed relatively to the support 65.

According to a modified embodiment, shown in FIGURE 11, the whirl chamber is defined by a frusto-conical wall including a passive imperforate section 48' and an active membrane wall at its bottom, shaped in conformity to the section 48', and enclosed on its outer side by a plenum chamber 55'. The parts 54', 56', and 58' are as previously described for the parts 54, 56, and 58. Support means for adjusting the inclination as described for FIGURES 8-10 may be provided. This embodiment provides a whirl chamber of changing, specifically decreasing, internal diameter, in the helically advancing flow direction.

The operation of the embodiments according to FIGURES 8-11 is as follows: The gas jets emanating from the passages 53 in the active membrane wall form a gas current that moves at high velocity peripherally about the whirl chamber. The material, whether solid or liquid, admitted through the inlet 57 are entrained by the gas current and moves circumferentially about the chamber wall. The material is repeatedly subjected to gas jets during each peripheral circuit, causing a rapid change in its state. Due to the axial progression of the gas toward the outlet end, the material moves in helical paths, ultimately reaching the outlet opening 58 or 58' and being discharged therethrough, together with gas. When the openings 51 in the end walls are provided, some of the gas escapes axially. If desired, the gas can be discharged substantially entirely through the opening 51, as by connecting the outlet 58 or 58' to a device, such as a lock like a star feeder, that prevents the flow of gas therethrough.

The residence time of the material within the whirl chambers of FIGURES 8-11 depends on the gas velocity and on the number of circumferential movements of the material. The latter implies dependency on the tightness of the helical turns of the path followed by the material. This tightness is, in part, influenced by the inclination of the central axis of the whirl chamber, which can be adjusted. Thus, moving the wedge 63 to raise the inlet end causes the material to move more rapidly in the axial direction, thereby widening the helical turns of the path and reducing the residence time.

I claim as my invention:

1. Method of changing the condition of material by conditioning gas which comprises the steps of:
    (a) forming within a whirl chamber which has a confining wall a gas current which moves peripherally about the chamber adjacently to said wall by emitting through at least a part of said wall a series of gas jets having major flow components parallel to the local part of the wall in a common circumferential direction, said jets emanating from locations which are spaced apart in the flow direction of said current by distances less than the throw distance of one jet and are positioned so that a jet emerges from said wall under another jet which is still in being,
    (b) admitting said material to the chamber and moving it as small units adjacently to said wall about the chamber by entrainment in said gas current, whereby the units are subjected repeatedly to blasts from said jets during a circuit, and
    (c) discharging the material from the chamber.

2. Method as defined in claim 1 wherein said series includes at least three jets spaced apart and positioned as defined.

3. Method as defined in claim 1 wherein gas from said current is discharged from the chamber in a direction substantially parallel to the chamber axis at a location displaced radially inwardly from said wall.

4. Method as defined in claim 1 wherein said units of the material are moved about said chamber in repeated circuits and are subjected repeatedly to jet blasts during each of several circuits.

5. Method as defined in claim 1 wherein said jets are emitted through an elongated membrane wall which constitutes a part of the confining chamber wall, and the remaining part of the chamber wall extends about an arc greater than half and less than a full circle, and is moved along said membrane wall.

6. Method as defined in claim 1 wherein said jets are emitted through a part of the confining chamber wall which part is stationary relatively to the remaining part of the confining wall.

7. In a device for changing the condition of material by a conditioning gas:
  (a) a whirl chamber having a confining wall defined at least in part by a membrane wall having extending therethrough a plurality of gas passages which are directed to emit a series of gas jets having major flow components parallel to said membrane wall in a common circumferential direction of the chamber, said passages being spaced apart in said circumferential direction by distances less than the throw distance of one jet and being positioned so that a jet emerges from a passage under another jet that is still in being,
  (b) plenum chamber means which are bounded in part by said membrane wall, are in communication simultaneously with said plurality of passages, and are situated outside the whirl chamber,
  (c) means for supplying said gas to the plenum chamber means for flow simultaneously through said passages into the whirl chamber to form therein a gas current moving peripherally completely about the chamber,
  (d) inlet means for admitting said material to said whirl chamber for subsequent entrainment as small units by said gas current and movement completely about the chamber adjacently to said confining wall, and
  (e) outlet means for discharging said gas and material from the whirl chamber.

8. A device as defined in claim 7 wherein said membrane wall includes at least three gas passages situated in spaced relation as defined along said circumferential direction, each passage being directed to emit a gas jet at an angle less than 35° to the surface of the membrane wall, whereby more than two gas jets cooperate to form said gas current.

9. A device as defined in claim 7 wherein said whirl chamber has at least one end opening at a location displaced radially inwardly from said confining wall for the discharge of gas from the chamber in a direction substantially parallel to the chamber axis.

10. A device as defined in claim 7 wherein said inlet means and outlet means include at least one opening formed in said confining wall.

11. A device as defined in claim 7 wherein said passages are formed by depressions in parts of the membrane wall toward the plenum chamber means and the surface of the membrane wall which is toward the interior of the whirl chamber is unobstructed to the movement of gas and said material adjacently to the membrane wall.

12. A device as defined in claim 7 wherein said membrane wall constitutes an active part of the whirl chamber, is elongated in a longitudinal direction, and includes a multitude of longitudinally spaced gas passages, and the remaining part of the whirl chamber constitutes a passive part of the whirl chamber, extends about an arc greater than half and less than a full circle, provides an opening, and is mounted for movement in said longitudinal direction along said membrane wall with the said opening directed toward the membrane wall, whereby different groups of said pasages emit gas jets through said opening into the whirl chamber when said passive part is moved longitudinally.

13. A device as defined in claim 12 wherein the width of said opening in the circumferential direction of the whirl chamber is at least three times as great as the intervals between the gas passages in the membrane wall, and the gas passages are directed to emit gas jets inclined at angles less than 35° to the surface of the membrane wall.

14. A device as defined in claim 12 wherein:
  (a) the surface of the membrane wall which adjoins the passive part of the whirl chamber is directed upwardly and said membrane wall has a longitudinal dimension which is many times the width of said opening,
  (b) said device includes a plurality of said passive chamber parts, each being a trough-shaped housing and disposed transversely to the longitudinal direction of the membrane wall, and
  (c) said device includes conveying means for moving said housings in unison and continuously along a circuit that includes:
    (1) an upper course in which the said openings are upward and the housings move in spaced relation above the membrane wall oppositely to said longitudinal direction, and
    (2) a lower course in which said housings are inverted, with their openings juxtaposed to said membrane wall, and move in the said longitudinal direction.

15. A device as defined in claim 14 wherein:
  (a) said upwardly directed surface of the membrane wall is substantially flat,
  (b) each of said housings has at each end thereof a closure closing at least an area which is adjacent to the confining wall,
  said inlet means includes a feeder positioned to supply said material by gravity into the housings through the said openings thereof while the respective housing is in said upper course, and
  (d) said outlet means includes a receiver situated beyond the end of the membrane wall toward which the housings move in the lower course for receiving said material.

16. A device as defined in claim 14 wherein said outlet means includes an opening formed at an end of each housing at a location displaced radially inwards from the confining wall thereof for the outflow of gas.

17. A device as defined in claim 14 wherein said outlet means includes passages formed in the confining wall of each housing for the outflow of gas.

18. A device as defined in claim 7 wherein said membrane wall is curved concavely toward the interior of the whirl chamber and is a stationary part of the chamber.

19. A device as defined in claim 18 wherein said whirl chamber is elongated along a central axis of concavity, the confining wall thereof being defined only in part by said membrane wall which extends through an arc between about 20° and 130° about said central axis, and the remaining part of said confining wall is imperforate save for said inlet and outlet means when any of the latter is formed in said confining wall.

20. A device as defined in claim 18 wherein:
  (a) said whirl chamber is substantially cylindrical and is mounted with the central axis thereof substantially horizontal,
  (b) said whirl chamber has end walls closing at least the area adjacent to the confining wall,
  (c) said inlet means includes an inlet opening formed in said confining wall at a level above the lowest part thereof near one axial end of the chamber, and
  (d) said outlet means includes an outlet opening for said material formed in said confining wall and displaced in the axial direction from said inlet opening.

21. A device as defined in claim 20 wherein at least one of said end walls of the whirl chamber has an opening formed therein at a location spaced radially inwards from the confining wall.

22. A device as defined in claim 20 which includes means for varying the inclination of said central axis of the whirl chamber, whereby the residence time of said material within the whirl chamber can be adjusted.

References Cited

UNITED STATES PATENTS

| | | | |
|---|---|---|---|
| 1,802,960 | 4/1931 | Simonds | 263—21 |
| 2,020,960 | 11/1935 | Pehrson et al. | 34—135 |
| 2,044,370 | 6/1936 | Shodron | 34—225 XR |
| 2,044,744 | 6/1936 | Hansen | 34—10 XR |
| 2,456,674 | 12/1948 | Caughey | 34—57 |
| 2,461,134 | 2/1949 | Arnold | 34—57 |
| 2,501,487 | 3/1950 | Whitman | 34—57 |
| 3,267,585 | 8/1966 | Futer | 34—236 |
| 3,276,627 | 10/1966 | Birkestrand | 34—136 |

FREDERICK L. MATTESON, Jr., *Primary Examiner.*

H. B. RAMEY, *Assistant Examiner.*

U.S. Cl. X.R.

34—57, 236